B. W. BEERY.
COMBINED BORING TOOL AND COUNTERSINK.
APPLICATION FILED APR. 7, 1917.
1,256,865.
Patented Feb. 19, 1918.
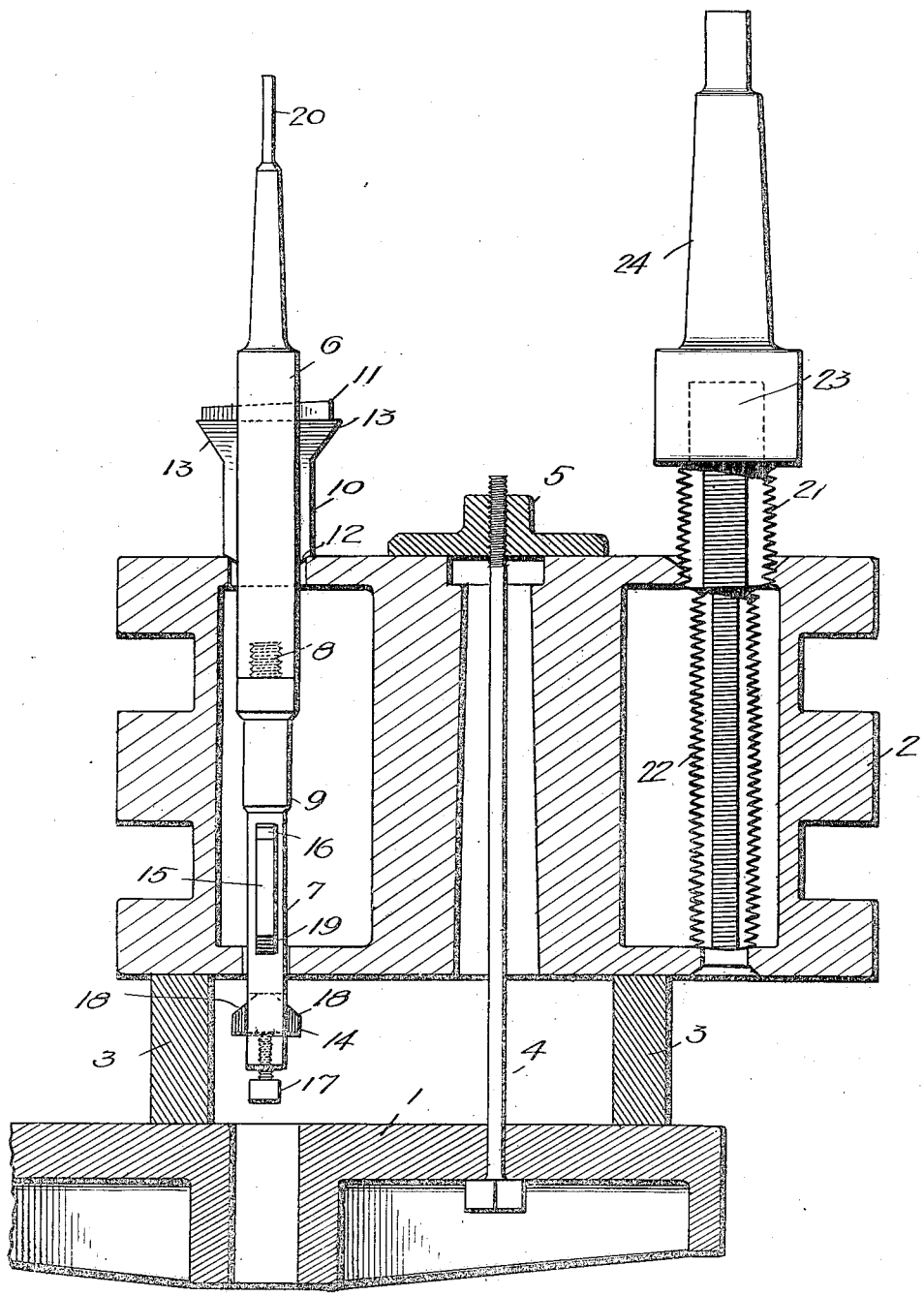
WITNESSES
INVENTOR
Bernard W. Beery
BY
ATTORNEYS

UNITED STATES PATENT OFFICE.

BERNARD WILLIAM BEERY, OF PORTSMOUTH, OHIO.

COMBINED BORING-TOOL AND COUNTERSINK.

1,256,865.

Specification of Letters Patent.

Patented Feb. 19, 1918.

Application filed April 7, 1917. Serial No. 160,424.

*To all whom it may concern:*

Be it known that I, BERNARD W. BEERY, a citizen of the United States, and a resident of Portsmouth, in the county of Scioto and State of Ohio, have invented certain new and useful Improvements in Combined Boring-Tools and Countersinks, of which the following is a specification.

My invention is an improvement in combined boring tools and countersinks and has for its object to provide a device of the character specified, especially adapted for preparing piston heads to receive the plugs shown and described in my prior Patent No. 1,219,223, dated March 13, 1917.

In the drawing is shown a sectional view of the improved boring tool and countersink.

The improved boring tool and countersink is shown in connection with the press table 1 of a drill, the piston head 2 being supported in spaced relation with respect to the table by means of strips 3 of suitable material, and the piston head is clamped to the table by means of a rod 4, passed through an opening in the table and through the central opening of the piston head, and engaged by a nut 5 above the head.

The improved tool consists of sections 6 and 7 which are detachably connected, the section 7 having a threaded stem 8 which engages a threaded opening in the end of the section 6, and the section 7 has a polygonal portion 9, for engagement by a wrench or the like to connect and detach the sections. The section 6 of the tool is provided with a transverse opening or passage, in which is arranged a combined cutter and reamer 10, the said cutter being in the form of a plate, of a width sufficient to extend beyond the section 6 at each side thereof, and the cutter and reamer is held in place by a wedge-shaped key 11. The lower corners of the plate are beveled as shown at 12 to form cutters, and at its upper end the plate is provided with outwardly extending wings 13 which are beveled on their under sides to form reamers. At its lower end the section 7 has a transverse opening in which is arranged a reamer 14, and the reamer is held in place by a set screw 17 threaded through the lower end of the section 7 into engagement with the reamer.

The reamer as shown extends beyond the opposite sides of the section 7 and the upper corners are beveled as shown at 18 to form reaming cutters. The section 7 is provided with another transverse passage intermediate its ends and within this passage is arranged a cutter 15, the said cutter being held in place by a wedge-shaped key 16. The cutter is a plate of a width to extend beyond the opposite sides of the section and it will be noted that the passage containing the cutter 15 is at right angles to the passages for the cutters 10 and 14. The lower corners of the cutter 15 are beveled as shown at 19 to form cutters, and the upper end of the section 6 has a shank 20 for engagement by a chuck to turn the tool.

The improved tap shown at the right of Fig. 1 consists of two portions 21 and 22 of unequal diameter, the portion 21 being of greater diameter than the portion 22. At the upper end of the tap is a shank 23 similar to the shank 20 for engaging the socket of the chuck 24 which is in effect an extension chuck.

The piston heads are as a rule provided with six sets of openings, each set consisting of an upper and a lower opening, and the openings of each set being registered. In order to receive the plugs shown in my prior patent, one of the openings must be of greater diameter than the other, both openings must be threaded, and at each opening the faces of the piston head must be reamed in order that the ends of the plug may be upset to prevent displacement thereof.

In the use of the tool, the reamer 14 is removed, and the bar is passed downward through a pair of registering openings until the cutting edges 12 engage the piston. The turning of the tool will now enlarge the opening at the top of the piston head and at about the time the said opening has been enlarged, the cutting edges 19 of the cutter 15 come into operation at the lower opening and this opening is also enlarged. A further movement of the tool brings the reamers 13 into action, and they ream the upper opening. The reamer 14 is now placed, and the tool is moved upward to permit the cutting edges 18 to ream the under opening.

After the openings have been cut and reamed they must be threaded, and the tool 21—22 is used for this purpose. The opening at the top is first threaded as shown in Fig. 1, and at about the time the said opening is threaded, the portion 22 engages the lower opening and this opening is afterward threaded.

I claim:—

1. A drill bar composed of detachably connected sections, one section having a transverse passage intermediate its ends, and being provided at its outer end with a shank for engagement by a chuck, the other section having a transverse passage intermediate its ends and a second passage near its outer end, and a cutter and reamer detachably held in the passage of the first section, a reamer detachably held in the outer passage of the second section, and a cutter detachably held in the intermediate passage of the second section the first named cutter and reamer having reaming wings at its upper end.

2. A drill bar having at one end a shank for engagement by a chuck, and having near each end and intermediate its ends transverse passages, a cutter in the intermediate passage, a reamer in the end passage remote from the shank and a cutter and reamer in the passage adjacent the shank, said cutter, reamer, and cutter and reamer extending beyond the opposite sides of the drill, and the cutter and reamer having reaming wings extending beyond the opposite sides of the cutter and reamer.

3. A drill bar having at one end a shank for engagement by a chuck, and having near each end and intermediate its ends transverse passages, a cutter in the intermediate passage, a reamer in the end passage remote from the shank and a cutter and reamer in the passage adjacent the shank.

4. A drill bar having at one end a shank for engagement by a chuck and having cutters for cutting openings of unequal diameter and having a reamer in connection with each cutter, the reamers facing each other, while the cutters cut in the same direction.

BERNARD WILLIAM BEERY.

Witnesses:
    LANE JAMES DINSMORE,
    FRANK W. MOULTON.